UNITED STATES PATENT OFFICE.

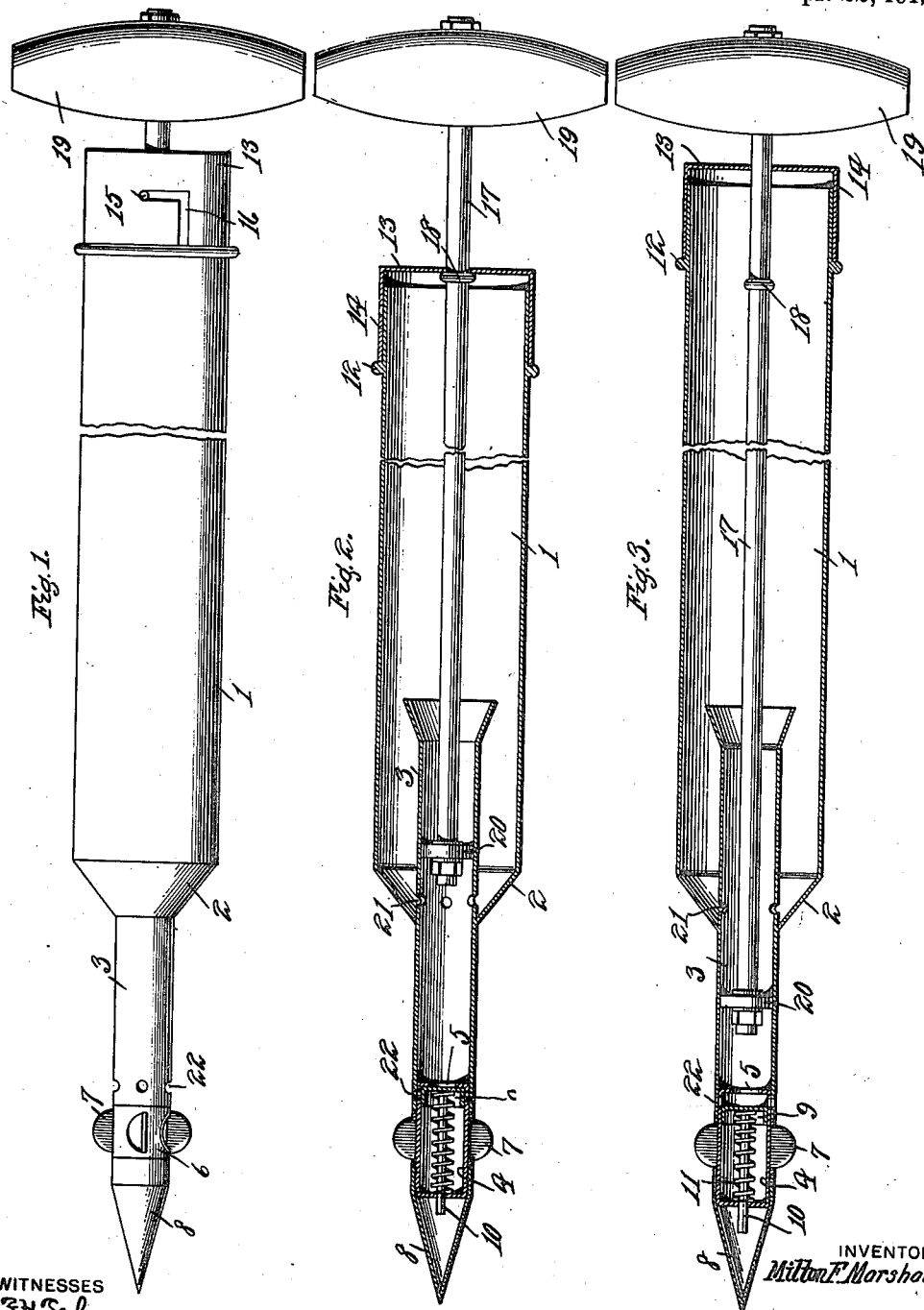

MILTON F. MARSHALL, OF PARSONS, KANSAS.

SPRAY-GUN.

1,301,149.  Specification of Letters Patent.  Patented Apr. 22, 1919.

Application filed February 7, 1917. Serial No. 147,201.

*To all whom it may concern:*

Be it known that I, MILTON F. MARSHALL, a citizen of the United States, residing at Parsons, in the county of Labette and State of Kansas, have invented certain new and useful Improvements in Spray-Guns, of which the following is a specification.

This invention relates to an improvement in spray guns, and more particularly to a device of this character which might be termed a "dope" gun, to be used in (securing) the extermination of dandelions, plantains, and other obnoxious weeds growing in a lawn or at some other place which is desired to be kept free of weeds, by shooting some killing liquid into and among the roots to thus kill not only the top or foliage part of the weed, but also the root.

An object of my invention is to provide a spray gun of the character described which includes a barrel like or tubular reservoir for the killing liquid constructed to form a handle of such proportions that the gun can be readily handled and used, together with penetrating and cutting means by which the root whether it be long and tuber like, as in the case of the dandelion, or whether it be bunchy with the fine hair like roots spreading from a common center, as in the case of the plantain, will be broken up and prepared for the reception of the killing liquid at a point to accomplish the most efficient action, and means by which the killing liquid is injected to strike the upper part of the plant as cut and penetrated and to then flow down into the penetration and thus strike all parts of the root structure.

A further object resides in providing means by which the flow of liquid from the gun is normally cut off, and the liquid discharge passages are closed to exclude dirt from finding its way into the gun when the cutting and penetrating operation is being accomplished.

Yet another object is to so construct the barrel and a pump mechanism by which the liquid is discharged from the gun, that the parts may be very readily disassembled for cleaning of the gun or for filling, or for any other desired purpose, and the actuation of the pump is such that a measured quantity of killing liquid will be supplied on each operative stroke of the pump piston while at the same time the discharge openings will be cleaned and freed of dirt or other matter which might tend to clog therein, by the force exerted by the expulsion of the killing liquid.

With the above and other objects in view, my invention consists in certain novel features of construction and combinations of parts which will be hereinafter set forth in connection with the drawings and then more particularly pointed out in the claims.

In the drawings:

Figure 1 is a view in side elevation of a spray gun constructed after the manner of my invention.

Fig. 2 is a longitudinal sectional view showing the pump parts in one of the extreme positions to which they can be moved.

Fig. 3 is a view similar to Fig. 2 showing the parts in the remaining operative position.

The tubular reservoir 1 is made of such length and size that it can be readily grasped and handled, and this tubular reservoir is restricted at one end as shown at 2 and is joined with the forcing barrel 3. As is shown, the forcing barrel is open at both ends and has the inner end thereof extending to be reëntrant into the tubular reservoir, the extreme inner end being swelled for easy entrance of the piston which will be hereinafter mentioned more in detail. The outer end of the forcing barrel 3 is internally screw threaded and a section of tubing shown at 4 is closed at one end and at the opposite end is provided with an inwardly extending flange which leaves the liquid passage 5 through this end. The flanged end of the section 4 is externally screw threaded and may thus be secured in the outer end of the forcing barrel to close the same except for the passage 5 through the inner end of the section 4.

A sleeve member 6 is made of a size to fit snugly over the tubing section 4 to bear against the outer end of the forcing barrel 3, and this sleeve has portions thereof cut and bent outwardly to provide the radially extending knives 7. A substantially cone shaped shell 8 is internally screw threaded at its widened out end and is adapted to be fitted and screwed upon the outer end of the tubing section 4, which is externally screw threaded, and then this cone shaped penetrating point is secured beyond the end of the forcing barrel and at the same time mounts the sleeve 6 rigidly in place by clamping the same against the end edge of the forcing barrel. With the structure as described, the tubular reservoir 1 can be used as a handle and as the penetrating point 8 is placed upon a weed over the root, and pressure is exerted downwardly upon the parts, this point will pierce or sink into the root and the knives 7 will act to quarter or split the root for reception of the killing liquid which is placed in a manner to be more fully set forth.

A plunger valve 9, which is preferably made of pressed sheet metal is mounted within the tube section 4 with the head disposed adjacent the passage 5 through the flange end of this tube section, and a stem 10 connected with the plunger valve 9 is extended through an opening provided in the closed end of the tube section 4 and has a coil spring 11 mounted therearound to bear between this end and the under side of the head of the plunger valve 9 to normally exert pressure to hold the plunger valve in the closed position against the flange having the passage 5 therethrough. While I have stated that the tube section 4 has one end thereof closed, it will of course be appreciated that this end might be left open and that a separate disk might be provided to form a bearing for the spring 11 and a guide for the stem 10, and due to the fact that the stem projects into the substantially cone shaped penetrating point 8, movement of the plunger valve 9 against the bearing pressure of the spring 11 will not be restricted by any of the remaining portions of the structure and the only restriction against opening movement of this valve will be the force exerted by the spring.

The forcing barrel 3 is mounted at one end of the tubular reservoir 1 and the remaining end is open and is provided with an outstanding flange or bead 12. A cap 13 provided with a rim edge 14 is adapted to be fitted over this open end of the tubular reservoir to bear against the flange 12 and a pin 15 and a slotted opening 16 are intended to secure the cap 13 in place after the manner of a bayonet joint. The cap 13 has a central opening through which the piston rod 17 is mounted to be capable of reciprocatory movement, and a shoulder 18 is provided on the piston rod 17 to limit outward movement of this rod while inward movement is limited by the handle 19. As has been stated, the forcing barrel 3 is swelled or made substantially bell shaped at its inner end and a plunger or piston 20 mounted on the inner end of the piston rod 17 is inserted through this swelled end of the forcing barrel and is brought to fit snugly within the body portion of the barrel to be moved therein through reciprocation of the piston rod 17. Openings or liquid supply passages 21 are provided through the wall of the forcing barrel 3 within the tubular reservoir but preferably closely adjacent the connection of the restricted end 2 of this reservoir with the barrel 3 and discharge openings 22 are provided through the tube section and through the forcing barrel preferably slightly within the flanged end of the tube section.

The manner of assembling the various portions of the structure has been set forth as the description has progressed, and it will of course be apparent that the various members might be constructed of any suitable material and might be shaped and connected in other manners than defined. When the handle 19 is inactive, the plunger valve 9 will close over the opening or passage 5 which establishes communication from the intake openings 21 through the discharge openings 22 and thus a clear passage between these openings does not normally exist as the normal tendency of the spring 11 is to force the plunger valve 9 to the closed position.

In use, the top cover or cap 13, which is held in place by the bayonet joint or connection, is removed and the reservoir 1 is filled with gasolene, crude oil, or other effective liquid, after which the cap 13 is replaced and is again secured in the closing position. The tubular reservoir is grasped and the cone shaped point 8 is placed in the weed over the root and is pressed into the earth to a depth of say three or four inches, depending upon the particular character of the weed and the characteristic growth of the root thereof, and the root is thus split and cut and the discharge openings 22 are brought within the root structure substantially at the point where the foliage branches therefrom. The handle 19 is then raised to extend the piston rod 17 to the limit permitted by the shoulder 18, and the piston 20 is thus brought to a position just above the intake or supply openings 21 in the forcing barrel which allows the liquid in the tubular reservoir 1 to flow through these openings into the lower part of the forcing barrel and to thus supply a measured quantity of liquid up to the height of the openings 21. The handle 19 is then moved toward the tubular reservoir to force the piston rod 17 inwardly and consequently the piston 20 is carried forward. As soon as the piston passes below the supply opening 21, the back flow of liquid from the forcing barrel is stopped and the pressure of the column of fluid in the barrel 3 is brought to bear against the head of the plunger valve 9 where the same is exposed through the passage 5. The spring 11 allows the plunger valve to recede before the pressure of the liquid column, thereby opening the discharge passages 22 and permitting the flow of the liquid through these passages into the roots of the weeds as the same have been cut and lacerated by the insertion of the cone shaped point and the passage of the wings or blades into the earth. Following the discharge of the measured quantity of "dope," or killing liquid, the penetrating end can be again removed from the earth and the same operation can be performed in conjunction with other weeds, it being understood that immediately the pressure of the liquid column within the forcing barrel 3 is exhausted, the plunger valve 9 will be again returned to close the passage 5 and the discharge passages or openings 22, thus effectively closing these parts to the discharge of an additional quantity of liquid or to the ingress of dirt as the gun is being inserted in and withdrawn from the earth. Repeated operations would be the same, and it will thus be understood that I have provided a spray particularly adapted for supplying "dope" or killing liquid in a measured quantity upon a weed or other obnoxious plant previously prepared for the reception of the liquid, and which gun is so constructed that the measured quantity of killing liquid is supplied and discharged at just the points desired and the chances of the liquid being accidentally discharged upon or spreading through the surrounding turf are remote, and also it will be readily apparent that the preparation of the roots of the weeds, whether they be of tuberous or of a more fibrous nature, will be most thorough, and that the parts are so constructed that they may be readily disassembled for cleaning or for any other desired purpose and the killing liquid can be readily supplied to the storage reservoir.

While I have herein shown and described only one specific form of the structure of my invention, it will be understood that a number of changes and modifications might be resorted to in the form and arrangement of the several parts without departing from the spirit and scope of my invention, and hence I do not wish to be limited to the exact disclosure but only to such points as may be set forth in the claims.

I claim:

1. A spray gun for use in killing weeds including a penetrating end having outstanding knives arranged thereon to cut and lacerate the root of a weed as the point is penetrated thereinto, said penetrating end provided with liquid discharge openings located inwardly beyond the knives, means to be actuated to inject a measured quantity of killing liquid through said openings into the root as prepared, and means to close the liquid discharge openings except during the interval of injection of the killing liquid into the root of the weed to thus guard against ingress of dirt.

2. A spray gun for use in killing weeds including a tubular reservoir shaped to provide a handle by which the implement may be held for use, a forcing barrel extending through one end of said tubular reservoir to project therefrom, a tube section connected with the outer end of the forcing barrel provided at its inner end with an overhanging flange having a liquid passage therethrough, a penetrating point mounted on said tube section, knives carried inwardly of the penetrating point, said forcing barrel having intake openings therethrough within the tubular reservoir and provided with discharge openings communicating with the interior thereof beyond the flange of the tube section, a piston mounted within the forcing barrel, a handle by which said piston is given reciprocatory movement within the barrel, a plunger valve mounted in the tube section to have slidable movement, and a spring mounted to bear against said valve to normally resiliently force the same to a position that the liquid discharge passages are closed against ingress of dirt and the liquid passage through the flanged end of said tube is closed against flow of liquid therefrom.

3. A spray gun of the class described comprising a soil penetrating end, a reservoir carried by the upper end thereof, a piston slidably mounted within said soil penetrating end, a casing carried by the lower end of said soil penetrating end, said casing provided with apertures formed therein, said soil penetrating end provided with registering apertures formed therein adapted to register with the apertures formed in said casing, a spring pressed valve adapted to move over said apertures and close the same, said casing provided with an open upper end for permitting the passage of liquid therethrough, and said piston adapted to reciprocate within said soil penetrating end for forcing said valve to an inoperative position and forcing liquid out through said apertures.

In testimony whereof I affix my signature in presence of two witnesses.

MILTON F. MARSHALL.

Witnesses:
CLYMENA MARSHALL,
FRANCES MARSHALL.